United States Patent [19]

Gutek et al.

[11] Patent Number: 4,587,159
[45] Date of Patent: May 6, 1986

[54] CLEAR SILICONE COATED FABRIC

[75] Inventors: Beth I. Gutek, Freeland, Mich.; Bernard Van Wert, Norcross, Ga.

[73] Assignee: Dow Corning Corporation, Midland, Mich.

[21] Appl. No.: 778,461

[22] Filed: Sep. 20, 1985

[51] Int. Cl.[4] ............................................. B32B 7/00
[52] U.S. Cl. ................................ 428/251; 427/407.2; 427/412; 428/266; 428/268; 428/429; 428/447; 428/448
[58] Field of Search ............... 428/251, 429, 447, 266, 428/268, 448; 427/407.3, 412, 381, 387, 389.8, 389.9

[56] References Cited

U.S. PATENT DOCUMENTS 3,373,053  3/1968  Clark .................................... 117/126
4,489,127  12/1984 Gutek et al. ......................... 428/266

Primary Examiner—Marion C. McCamish
Attorney, Agent, or Firm—Edward C. Elliott

[57] ABSTRACT

The method of this invention produces a silicone coated glass fabric which is translucent or transparent as desired and which has a smooth dry surface. The coated glass fabric is useful in producing air-supported and tension-supported roofs for structures such as greenhouses. A glass fabric is first coated with a polydiorganosiloxane, in which the organo radicals are methyl and phenyl radicals in a ratio of from 0.25 to 3.7, in an amount sufficient to impregnate the fibers in the yarns of the fabric, but leaving the interstices of the fabric open. This first layer is then followed by coating with a polydimethylsiloxane elastomer to give a continuous layer, then coating with an elastoplastic organopolysiloxane resin to give a smooth, dry surface on the glass fabric reinforced sheet.

9 Claims, 2 Drawing Figures 4,587,159

CLEAR SILICONE COATED FABRIC

BACKGROUND OF THE INVENTION

1. Field of the Invention

This invention relates to fabric coated with polyorganosiloxanes which is useful as architectural fabric for use in structures such as air-supported and tension-supported roofs.

2. Background Information

In U.S. Pat. No. 3,373,053, issued Mar. 12, 1968, Clark teaches a transparent sheet material consisting essentially of square woven glass cloth coated and impregnated with a cured polymethylphenylsiloxane having from 45 to 55 percent by weight phenyl groups. This transparent sheet was useful in electrostatic printing equipment to produce transparencies.

In U.S. Pat. No. 4,489,127, issued Dec. 18, 1984, Gutek and VanWert teach a method of producing a silicone resin-coated fabric comprising an elastoplastic organopolysiloxane resin coated silicone elastomer membrane reinforced with fabric. The coated fabric is useful in producing structures such as air-supported roofs or tension-supported roofs.

The fabric of Gutek et al. has proven useful in making structures which do not require a large amount of light on the interior. A comparable fabric which was clear or transparent to sunlight was needed for uses such as in greenhouses or solar heated structures.

SUMMARY OF THE INVENTION

This invention relates to a silicone elastomer coated glass fabric which is translucent or transparent. A first coating is applied to the glass fabric reinforcement, which coating consists essentially of polydiorganosiloxane in which the organo radicals are methyl and phenyl radicals in a ratio of from 0.25 to 3.7. A sufficient amount of this first coating is applied to the glass fabric to completely coat and impregnate the fibers in the threads of the fabric, but not enough to fill in the interstices of the fabric. This first coating is then followed by a coating of polydimethylsiloxane elastomer to fill in the interstices, which elastomer coating is in turn coated with an elastoplastic organopolysiloxane resin to give a clear or translucent glass reinforced sheet having a slick, dry surface.

It is an object of this invention to produce a silicone resin-coated glass fabric which is clear or translucent which is useful in air-supported structures or tension-supported structures.

It is an object of this invention to produce a silicone resin-coated glass fabric useful in air-supported structures or tension-supported structures that is clear or translucent and also economical.

DESCRIPTION OF THE INVENTION

The invention relates to a silicone coated glass fabric comprising a transparent or translucent silicone coated glass fabric comprising a first layer of polydiorganosiloxane in which the organo radicals are methyl and phenyl radicals in a ratio of from 0.25 to 3.7, impregnating and coating the yarns of the glass fabric but not filling in the interstices of the glass fabric; a second layer of silicone elastomer covering the first layer and filling in the interstices of the glass fabric; and a third layer of elastoplastic organopolysiloxane resin to give a smooth, dry surface.

This invention relates to a method of producing a transparent or translucent silicone coated glass fabric comprising (A) applying to a glass fabric a first layer consisting essentially of a polydiorganosiloxane in which the organo radicals are methyl and phenyl radicals in a ratio of from 0.25 to 3.7 in sufficient amount to impregnate and coat the yarns of the glass fabric, but not filling the interstices of the glass fabric, then (B) applying a second layer consisting essentially of a silicone elastomer in sufficient amount to cover the first layer and to fill in the interstices of the glass fabric, then (C) applying a third layer consisting essentially of an elastoplastic organopolysiloxane resin, to yield a transparent or translucent sheet having a glass fiber reinforcement and a smooth, dry surface.

In the development of coated fabric useful for structural uses such as air-supported or tension-supported roofs, an improved coated fabric was developed which first coated the fabric with silicone elastomer to coat the yarns in the fabric, then overcoated the cured elastomer with a thin layer of resin, the improvement being a method of obtaining adhesion between the different coats on the fabric so that the coated fabric could be useful when adhesively bonded to other surfaces, including two pieces of the coated fabric being bonded to each other to produce larger pieces. This coated fabric was successful in applications in which an opaque sheet was satisfactory, but not where a clear or translucent covering was desired, such as in a greenhouse or solar heating device.

The method of this invention and the resulting silicone coated glass fabric, being clear or translucent, was developed to provide a clear or translucent covering that could be used in structural applications with a minimum increase in cost over the current method.

Figure 1:
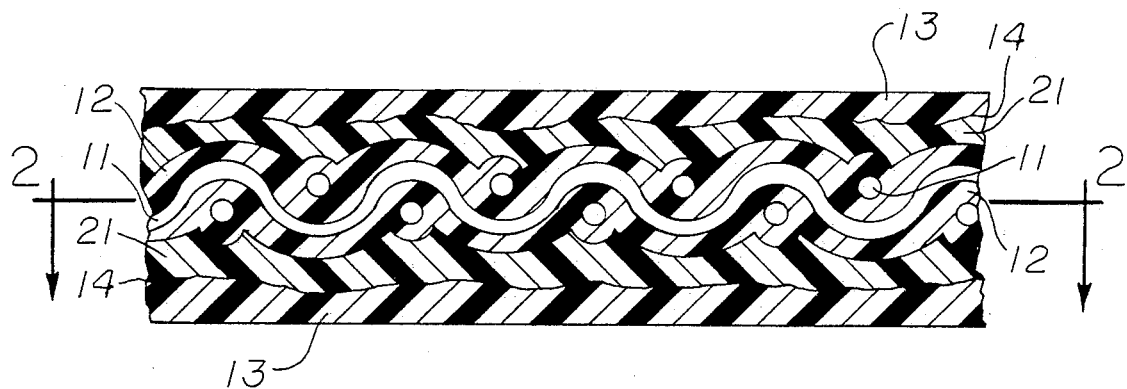
FIG. 1 is a cross-section of a glass fabric coated with a first coat of silicone elastomer having methyl and phenyl radicals in a ratio of between 0.25 and 3.7 which is subsequently coated with a layer of polydimethylsiloxane elastomer and a layer of elastoplastic organopolysiloxane resin.

FIG. 1 is a cross-section of a silicone coated glass fabric produced by the method of this invention. The yarns 11 are of glass fibers which have been formed into yarns, woven into a fabric, and then heat-cleaned to remove the oils and lubricants applied to the fibers in the process of forming the yarns and weaving the fabric. The fabric may be treated after heat-cleaning with a finish that is compatible with the coating to be applied over the glass fabric. The fabric yarns 11 are coated with a first coat 12 of polydiorganosiloxane in which the organo radicals are methyl and phenyl radicals in a ratio of from 0.25 to 3.7. The polydiorganosiloxane coating 12 is present in sufficient amount to impregnate the yarn 11 and form a coating around the individual yarns. There is not sufficient coating present to fill in the interstices of the fabric. Because the polydiorganosiloxane of coating 12 contains both methyl and phenyl radicals, the refractive index of the coating is closer to that of the glass fiber than is the previously used polydimethylsiloxane. A coating which gives a visibly improved degree of translucency is provided when sufficient phenyl radical is present to give a methyl to phenyl ratio of from 0.25 to 3.7 when compared to a coating having only methyl radicals. As the amount of phenyl radicals is increased, the refractive index of the coating increases and becomes closer to that of the glass fabric. A preferred ratio of methyl to phenyl radicals is from 0.6 to 1.5 with the most preferred ratio being about 1 to 1. The refractive index of the glass in the fabric is about 1.549. A polydiorganosiloxane having a 1 to 1 ratio of methyl to phenyl radicals has a refractive index of about 1.551. A polydimethylsiloxane has a refractive index of about 1.404. The closer the refractive index of the coating is to the refractive index of the glass fiber, the clearer the coated sheet will be. In this invention, it has been discovered that only the coating in direct contact with the glass fibers is required to have the necessary match in refractive index. When the glass yarns are impregnated and coated with a polydiorganosiloxane having a refractive index approaching that of the glass fibers and this coating is subsequently coated with succeeding coats of polymethylsiloxane, a finished sheet can be produced which can be varied from translucent to clear. The closer the match in refractive index between the first coat and the glass, the clearer the final sheet of coated glass fabric. The polydiorganosiloxane used to produce the coating 12 has to have a viscosity which is low enough to allow the coating to penetrate the yarns and displace the air between the glass fibers. The viscosity of the polydiorganosiloxane can be adjusted by dissolving the polymer in solvent if necessary to give the required low viscosity. A viscosity of about 0.5 Pa·s at 25° C. has been found sufficiently low to impregnate the yarns and still give a coating on the outside of the yarns without filling the interstices between the yarns.

After the layer 12 is applied and any solvent is removed and the coating is cured, a second layer of silicone elastomer 21 is applied. The second layer 21 is applied in sufficient amount to coat the first layer and to close the interstices of the fabric to give a continuous coating over the fabric. Preferably this coating 21 is applied in one step, for economical reasons, but more than one application could be used if desired. The silicone elastomer used for layer 21 preferably has a durometer after curing of less than 30 on the Shore A scale. The silicone elastomer used for layer 21 preferably is a polydimethylsiloxane elastomer because these dimethyl elastomers are the most economical and the refractive index of layer 21 is not required to be matched to the glass fabric so the more expensive phenyl radicals are not necessary in this layer. After coating 21 is applied and cured, coating 13 of elastoplastic organopolysiloxane is applied over coating 21 and cured.

Figure 2:
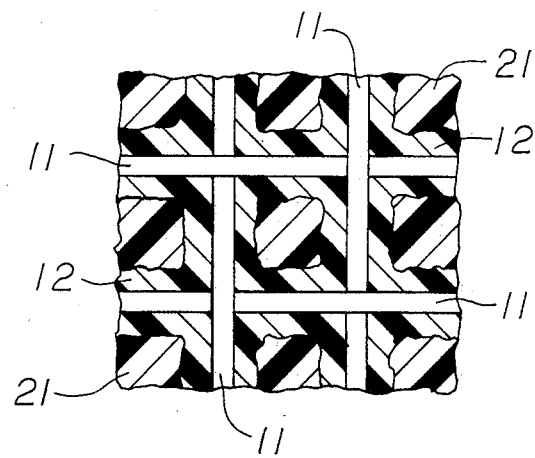
FIG. 2 is a cross-section of the fabric coated as in FIG. 1 showing the first coat of silicone elastomer which impregnates and coats the fabric yarn while the second coat of polydimethylsiloxane elastomer covers the first coat and fills in the interstices of the fabric between the yarns.

FIG. 2 illustrates a cross-section of the construction described above and illustrated in FIG. 1. The first layer 12 is shown impregnating and coating the glass yarns 11 going in both directions as in a woven fabric. The layer 12 does not fill the interstices between the yarns. The second layer 21 is shown coating the layer 12 and filling in the interstices between the coated yarns.

As mentioned above, any of the layers of polysiloxane can be composed of a single layer or of multiple layers. Preferred is a single application to form each layer because this is most economical, but multiple applications can be used to produce each layer if desired.

As discussed above, layer 12, forming the first coat of polydiorganosiloxane over the glass yarns, is required to have both methyl and phenyl radicals to adjust the refractive index of the coat to the desired value. As phenyl radical is added, the refractive index value rises to approach that of the glass, but the cost also rises. The balance between increased transparency of the silicone coated glass fabric and the increased cost must be determined by the user. Polydiorganosiloxane 12 could be a fluid, if it has a high enough viscosity to prevent it from being mixed with coating 21 when it is applied. Preferably, polydiorganosiloxane 12 is a curable polymer which forms an elastomer upon cure. Any of the well-known means of making polydiorganosiloxane which cures can be used; such as, the addition of organic peroxides, the use of vinyl radicals in the polymer and peroxides to crosslink the polymer through the vinyl groups, the use of vinyl radicals in the polydiorganosiloxane and the addition of crosslinking agents such as siloxanes containing hydrogen on silicon units in conjunction with platinum containing catalyst, and the use of any of the well-known methods of producing silicone elastomer which cure upon exposure to moisture, such as adding an alkyltrialkoxysilane to a polydiorganosiloxane having hydroxyl endblocking. The second coat of silicone elastomer 21 which covers the first coat and fills in the interstices of the fabric is preferably the silicone elastomer of U.S. Pat. No. 4,489,127, issued Dec. 18, 1984, which is hereby incorporated by reference to describe the preferred curable silicone elastomer composition and its method of manufacture.

The elastoplastic organopolysiloxane resin 13 which serves to form a smooth, dirt resistant surface for the coated fabric can be any of the well-known elastoplastic organopolysiloxane resins such as these containing silicone block copolymers such as those described in U.S. Pat. No. 3,280,214, issued Oct. 18, 1966 to Mitchell, U.S. Pat. No. 3,328,481, issued to Vincent; U.S. Pat. No. 3,629,228, issued Dec. 21, 1971 to Hartlein and Olsen; and U.S. Pat. No. 3,639,155, issued Feb. 1, 1972 to Hartlein and Vincent, said patents being incorporated by reference to show the block copolymers and their method of manufacture.

The most preferred silicone elastomer 12 and elastoplastic organopolysiloxane resin 13 are those disclosed in U.S. Pat. No. 4,489,127, incorporated above by reference, where the combination of silicone elastomer and elastoplastic organopolysiloxane resin form on interface which is an adhesive bond derived from a combination comprising (i), polydiorganosiloxane of the formula $X(R_2SiO)_aSiR_2Y$ where R is a monovalent hydrocarbon radical containing no more than 6 carbon atoms, X is a condensable endblocking group and a has a value such that the polydiorganosiloxane has a viscosity of greater than 1 Pa·s at 25° C., (ii) a hydroxyl radical containing, solid, benzene soluble resin copolymer consisting essentially of $R_3SiO_{\frac{1}{2}}$ units and $SiO_{4/2}$ units where R is as defined above, there being from 0.6 to 0.9 inclusive $R_3SiO_{\frac{1}{2}}$ units for every $SiO_{4/2}$ unit, at least 95 percent of all R radicals in (ii) being methyl, and (iii) a condensation catalyst for (i) and (ii). As disclosed in the incorporated patent, these ingredients that form the interface which is an adhesive bond can be present as ingredients in the silicone elastomer coating 12 or can be in a primer coat applied over the silicone elastomer coat 12 and upon which the elastoplastic organopolysiloxane resin 13 is applied.

The method of applying the various layers to the glass fabric can be by any of the well-known coating methods for silicone elastomers and silicone resins. A preferred method of coating the silicone elastomer layers is by passing the fabric, or previously coated fabric, through a bath of the catalyzed elastomer dispersed in solvent to give the desired coating thickness, then heating to drive off the solvent and aid in curing the elastomer coating. In those cases in which the elastomer is cured by exposure to moisture, the hot air should contain moisture, preferably by injection of steam into the oven to aid in cure of the elastomer. The silicone elastomer layer can be applied in one, two, or more layers. The outer layer of elastomer, at least, if it contains ingredients (i), (ii), and (iii) may be tacky when it comes from the curing oven, before it is coated with the elastoplastic organopolysiloxane resin. If so, the surface of the coated fabric is covered with a release sheet so that the fabric can be rolled up for storage. To continue the method, the release sheet is removed, and the elastoplastic organopolysiloxane resin is coated over the silicone elastomer and cured. The cure times and temperatures are dependent upon such variables as coating thickness, choice of solvent if used, temperature used, and air humidity for those systems curing on exposure to moisture. Times in the range of 5 to 15 minutes at temperatures of from 80° to 130° C. have been found useful.

The various embodiments of the method of this invention yield a silicone resin coated glass fabric which is transparent or translucent and is useful for constructing structures such as air-supported and tension-supported roofs for structures such as greenhouses and solar heated buildings. The composition of the first coat of polydiorganosiloxane can be varied to obtain the desired degree of clarity in the silicone coated glass fabric.

Following are examples illustrating the method and compositions of this invention and the silicone coated glass fabric that is produced and its properties. These examples are included for illustrative purposes and should not be construed as limiting the invention which is properly set forth in the appended claims.

All parts are parts by weight.

EXAMPLE 1

A glass fiber fabric was coated in accordance with this invention to produce a clear, smooth surfaced, semi-flexible flexible coated fabric.

A mixture of 50 parts of toluene, 50 parts of polyphenylmethylsiloxane fluid having a viscosity of about 0.5 Pa·s at 25° C. and about 4.5 percent by weight hydroxyl radicals as polymer endblockers (methyl to phenyl ratio of 1), and 0.5 parts of aluminum acetyl acetonate was applied to heat cleaned glass fabric (Style 7544 from Burlington Industries, a 0.61 kg/m$^2$, 7.5×7.5 ends per 25 mm construction) by dipping. The solvent was removed by heating the coated fabric for 5 minutes at 100° C. in a hot air oven. The coating was sufficient to impregnate the glass fibers and threads of the fabric, removing the air between the fibers, but not sufficient to fill in the interstices of the woven fabric. The coating was cured for 10 minutes at 225° C. to transform the fluid into a solvent insoluble polymer. The glass fibers were not visible in the coating.

The coated fabric was then dipped into a 50 percent solids solution of a low viscosity flowable, acetoxy cured, room temperature curing sealant. The sealant was the product obtained by mixing 90 parts of a hydroxyl endblocked polydimethylsiloxane fluid having a viscosity of about 13.5 Pa·s at 25° C., 1.8 parts of a hydroxyl endblocked polydimethylsiloxane fluid having a viscosity of about 0.04 Pa·s at 25° C., and 8.9 parts of fumed silica having a surface area of about 150 m$^2$/g. After thorough mixing, the reinforced fluid was mixed with 5.3 parts of a mixture of 100 parts of a 50/50 mixture of methyltriacetoxysilane and ethyltriacetoxysilane with 0.5 part of dibutyltindiacetate. The solvent was removed from this coating by heating for 10 minutes at 100° C. This second coating was applied in an amount sufficient to fill in the interstices of the fabric so that the coated fabric was now completely coated with a smooth continuous coat over the fabric. A clear sheet resulted which did not show the individual glass threads.

A third coating solution was prepared by mixing 20 parts of a silicone mixture, 0.5 part of aminopropyltriethoxysilane, and 80 parts of toluene. The silicone mixture consisted of the product obtained by mixing 27.4 parts of a hydroxyl endblocked polydimethylsiloxane fluid having a viscosity of about 2 Pa·s at 25° C. with 29.7 parts of a solid benzene soluble resin copolymer consisting essentially of trimethylsiloxy units and SiO$_2$ units in a ratio of about 0.77 to 1. The resin had a hydroxyl content of about 2.8 percent by weight. The silicone mixture also contained 6.3 parts of resin copolymer obtained by treating the above type of resin copolymer with hexamethyldisilazane to remove hydroxyl radicals and replace them with trimethylsilyl radicals, 2.3 parts of isopropanol, a total of 34.2 parts of xylene, and 0.14 part of a reaction product of 115 parts of tetramethylguanidine, 144 parts of 2-ethylhexanoic acid, and 1036 parts of xylene. The silicone mixture contained 43.3 percent polydimethylsiloxane fluid and 56.7 percent resin on a solids basis.

The third coating solution was applied by dipping the previously coated fabric into the solution, then removing the solvent by heating for 10 minutes at 100° C. This third solution gave a thin coating of about 0.04 mm to provide a bond between the second and fourth coats.

A fourth coating solution was prepared by mixing 55 parts of an organopolysiloxane block copolymer mixture, and 45 parts of toluene. The organopolysiloxane block copolymer mixture contained about 76 parts of copolymer containing 26.4 mol percent phenylsiloxy units, 60.5 mol percent dimethylsiloxy units, and 13.1 mol percent methylmethoxysiloxy units, 3.5 parts of methyltrimethoxysilane, and 0.41 part of tetrabutyltitanate.

The fourth coating was applied by dipping and then curing for 10 minutes at 100° C.

The resulting coated fabric was a clear sheet, having a slick, dry surface. The coated fabric was semi-flexible in that it could be folded back upon itself and creased without failing by cracking. The coatings were firmly bonded to each other.

EXAMPLE 2

A comparative example was prepared.

A sample of glass fabric as in Example 1 was coated with a solution of 50 parts of toluene and 50 parts of a trimethylsiloxy endblocked polymethylphenylsiloxane fluid having a viscosity of about 0.5 Pa·s at 25° C., by dipping and then drying 10 minutes at 100° C. The coated fabric was then dipped into a second coating and dried as in Example 1. The result was a cloudy coated sheet because the first coat of phenylmethyl fluid in this case was not cured and it blended with the second coat during the dipping operation so that the material in between the glass fibers of the threads no longer had a refractive index close enough to that of the glass to result in a clear coating. In the first example, the phenylmethylsiloxane first coating was cured so that its refractive index was close to that of the glass fibers it was surrounding and impregnating.

EXAMPLE 3

A mixture was prepared of 50 parts of toluene, 50 parts of the polyphenylmethylsiloxane of Example 1, and 0.5 part of zinc octoate solution (8 percent by weight zinc). The mixture was heated to reflux and water trapped off until about ½ of the silanol groups were condensed. After cooling, sufficient of a mixture of ethyltriacetoxysilane and methyltriacetoxysilane was added to react with the remaining hydroxyl radicals.

A sample of glass fabric as in Example 1 was dipped into the above mixture, then dried and cured as in Example 1. This coated fabric was clear. The second, third, and fourth coatings were then applied as in Example 1. The finished sheet was a clear sheet having a slick dry surface. Because the first coat was cured, it did not blend with the second coat as in Example 2.

EXAMPLE 4

A mixture of 100 parts of the polyphenylmethylsiloxane of Example 1 was mixed with 0.9 part of potassium hydroxide, then heated to 150±C. and the resulting water was trapped off. Polymerization was continued until the viscosity was raised to 0.7 cps, then the fluid was neutralized with glacial acetic acid and filtered. The fluid was then dissolved in toluene (40 parts fluid and 60 parts toluene).

A curable composition was prepared by mixing sufficient solution from above to give 100 parts of the polyphenylmethylsiloxane with 28.3 parts of a 50/50 mixture of methyltriacetoxysilane and ethyltriacetoxysilane. A piece of the glass fabric of Example 1 was dipped in the above mixture and then dried as in Example 1. The fluid impregnated the glass fibers of the threads and resulted in clear threads. The impregnated sheet was then coated with a second, third, and fourth coating as in Example 1. The result was a clear, flexible sheet having a slick surface.

EXAMPLE 5

A first coating mixture was obtained by mixing 100 parts of a polyphenylmethylsiloxane having the formula

when Vi is vinyl radical, Me is methyl radical and Ph is phenyl radical, (refractive index is 1.56), 100 parts of toluene, 4.3 parts of PhSi(OSiMe₂H)₃, 1 part of HMe₂SiOSiPh₂OSiMe₂H, 0.15 part of a platinum catalyst having about 0.7 weight percent platinum, and 0.02 part of methyl butynol cure inhibitor. The mixture had a viscosity below 0.01 Pa·s at 100° C.

A piece of the glass fabric of Example 1 was dipped in the above mixture then dried and cured by heating for 10 minutes at 150° C. The individual fibers of the cloth were coated with the cured polymer, but the interstices of the threads were still open. A second, third, and fourth coating were then applied as in Example 1. The resulting sheet was clear and flexible with a slick surface.

EXAMPLE 6

A first mixture was prepared by mixing 100 parts of a copolymer of the formula

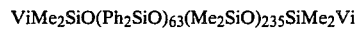

(refractive index is 1.49) (methyl to phenyl ratio is 3.76) where the radicals are as shown in Example 5, 100 parts of toluene, 0.84 part of PhSi(OSiMe₂H)₃, 0.15 part of the platinum catalyst of Example 5, and 0.02 part of methylbutynol.

This first coating was applied to a piece of cloth as in Example 5, then a second, third, and fourth coating was applied as in Example 5.

The resulting sheet was flexible, but not as clear as that of Example 5. It was clearer than a sheet produced as in Example 1 of U.S. Pat. No. 4,489,127 when the first coat was a polydimethylsiloxane as used in the second coat of Example 1 of this invention.

That which is claimed is:

1. A transparent or translucent silicone coated glass fabric comprising a first layer of polydiorganosiloxane, in which the organo radicals are methyl and phenyl radicals in a ratio of from 0.25 to 3.7, impregnating and coating the yarns of the glass fabric but not filling in the interstices of the glass fabric; a second layer of silicone elastomer covering the first layer and filling in the interstices of the glass fabric; and a third layer of elastoplastic organopolysiloxane resin to give a smooth, dry surface.

2. The silicone coated glass fabric of claim 1 in which the polydiorganosiloxane forming the first layer is an elastomer.

3. The silicone coated glass fabric of claim 1 in which the polydiorganosiloxane forming the first layer has a methyl to phenyl ratio of from 0.6 to 1.5.

4. The silicone coated glass fabric of claim 3 in which the polydiorganosiloxane forming the first layer is an elastomer.

5. The silicone coated glass fabric of claim 4 in which the second layer of silicone elastomer and the third layer of elastoplastic organopolysiloxane resin form an interface which is an adhesive bond derived from a combination comprising
   (i) polydiorganosiloxane of the formula $X(R_2SiO)_aSiR_2Y$ where R is a monovalent hydrocarbon radical containing no more than 6 carbon atoms, X is a condensable endblocking group and a has a value such that the polydiorganosiloxane has a viscosity of greater than 1 Pa·s at 25° C.,
   (ii) a hydroxyl radical containing, solid, benzene soluble resin copolymer consisting essentially of $R_3SiO_{\frac{1}{2}}$ units and $SiO_{4/2}$ units where R is as defined above, there being from 0.6 to 0.9 inclusive $R_3SiO_{\frac{1}{2}}$ units for every $SiO_{4/2}$ unit, at least 95 percent of all R radicals in (ii) being methyl, and
   (iii) a condensation catalyst for (i) and (ii).

6. A method of producing a transparent or translucent silicone coated glass fabric comprising
   (A) applying to a glass fabric a first layer consisting essentially of a polydiorganosiloxane in which the organo radicals are methyl and phenyl radicals in a ratio of from 0.25 to 3.7 in sufficient amount to impregnate and coat the yarns of the glass fabric, but not filling the interstices of the glass fabric, then (B) applying a second layer consisting essentially of a silicone elastomer in sufficient amount to cover the first layer and to fill in the interstices of the glass fabric, then (C) applying a third layer consisting essentially of an elastoplastic organopolysiloxane resin, to yield a transparent or translucent sheet having a glass fiber reinforcement and a smooth, dry surface.

7. The method of claim 6 in which the polydiorganosiloxane of (A) is an elastomer.

8. The method of claim 7 in which the polydiorganosiloxane of (A) has a methyl to phenyl ratio of from 0.6 to 1.5.

9. The method of claim 8 in which the silicone elastomer of (B) and the elastoplastic organopolysiloxane resin of (C) form an interface which is an adhesive bond derived from a combination comprising (i) polydiorganosiloxane of the formula $X(R_2SiO)_aSiR_2Y$ where R is a monovalent hydrocarbon radical containing no more than 6 carbon atoms, X is a condensable endblocking group and a has a value such that the polydiorganosiloxane has a viscosity of greater than 1 Pa·s at 25° C., (ii) a hydroxyl radical containing, solid, benzene soluble resin copolymer consisting essentially of $R_3SiO_{\frac{1}{2}}$ units and $SiO_{4/2}$ units where R is as defined above, there being from 0.6 to 0.9 inclusive $R_3SiO_{\frac{1}{2}}$ units for every $SiO_{4/2}$ unit, at least 95 percent of all R radicals in (ii) being methyl, and (iii) a condensation catalyst for (i) and (ii).

* * * * *